United States Patent [19]

Wilder

[11] 4,017,006
[45] Apr. 12, 1977

[54] APPARATUS FOR HEATING AND DISPENSING BOILING LIQUIDS
[76] Inventor: Harvey Wilder, 1725 Crest Drive, Hagerstown, Md. 21740
[22] Filed: May 5, 1975
[21] Appl. No.: 574,473
[52] U.S. Cl. .......................... 222/67; 222/146 HE; 219/296; 219/323
[51] Int. Cl.² ......................................... B67D 5/08
[58] Field of Search ............. 222/67, 146 HE, 395; 219/323, 333, 296, 306; 137/430, 433

[56] References Cited
UNITED STATES PATENTS

| | | | |
|---|---|---|---|
| 2,542,543 | 2/1951 | Losee | 222/395 X |
| 2,568,474 | 9/1951 | Van Sciver | 222/146 HE |
| 2,853,877 | 9/1958 | Smith | 222/67 X |
| 2,903,163 | 9/1959 | Newman | 222/146 HE X |
| 3,084,047 | 4/1963 | Holstein et al. | 222/67 X |
| 3,181,732 | 5/1965 | Immermann et al. | 222/146 HE X |
| 3,712,512 | 1/1973 | Snider, Jr. et al. | 222/67 |
| 3,743,141 | 7/1973 | Mnilk et al. | 222/67 |
| 3,787,659 | 1/1974 | Olland | 222/146 HE X |

FOREIGN PATENTS OR APPLICATIONS 886,060  8/1953  Germany ............................. 222/67

Primary Examiner—Robert B. Reeves
Assistant Examiner—Charles A. Marmor
Attorney, Agent, or Firm—Seidel, Gonda & Goldhammer

[57] ABSTRACT

Apparatus including a housing having an inlet connected to a source of pressurized liquid will flow into the housing being controlled by an inlet valve responsive to a float in the housing. Liquid in the housing is rapidly heated to boiling by means of an electrical immersion heater so that the position of the float is responsive to the elevation of the liquid-vapor interface.

13 Claims, 5 Drawing Figures

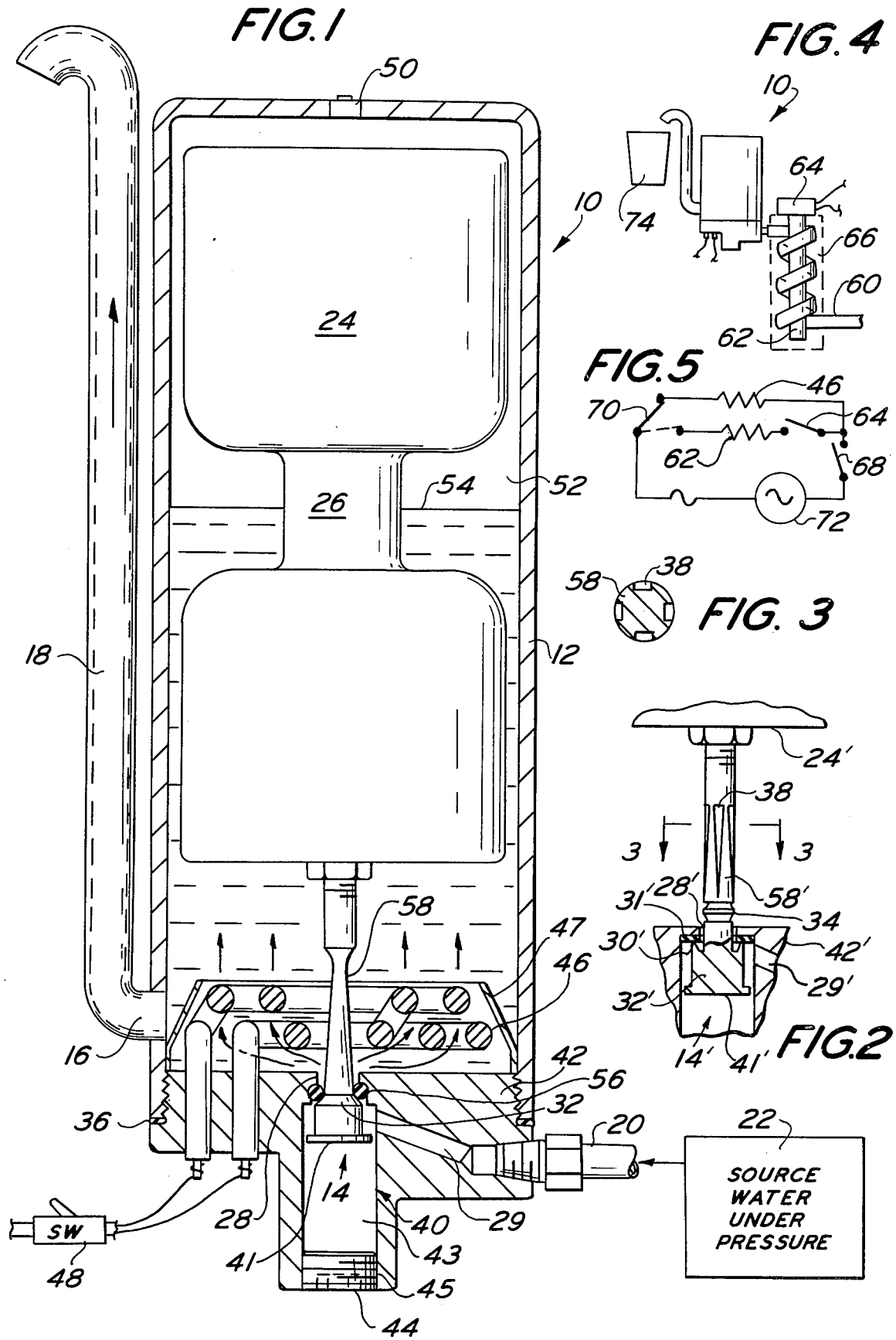

APPARATUS FOR HEATING AND DISPENSING BOILING LIQUIDS

BACKGROUND

A large number of devices have been proposed heretofore for heating liquids including hot water heaters, vending machines sterilizers, etc. The prior art devices generally involve a large chamber for storing heated water and/or utilized a thermostat for regulating the heat input to the liquid. Each of these features is considered to be objectionable.

The heating and storing of a large quantity of hot water as is the case in a conventional home not water heater is objectionable because of the slow response time needed to heat a large body of water and the heat losses in maintaining a large body of water at a constant temperature in readiness for use. Thermostats as a control means are objectionable from the viewpoint that they necessarily involve drift, variations in manufacturing tolerances, and the inability to be used with a system wherein the liquid is to be dispensed at boiling temperatures.

The present invention is directed to apparatus for dispensing a liquid at its boiling temperature. The apparatus includes a housing having an inlet for receiving a liquid under pressure and an outlet for discharging the liquid at its boiling temperature. Flow into the housing is controlled by an inlet valve. The inlet valve is coupled to a float in the housing for operation in response to the position of the float.

A heater is provided in the housing for rapidly heating the liquid to its boiling temperature so that the float controls the inlet valve in response to the elevation of the liquid-vapor interface in the housing. An on-off switch means is provided for operating the heater to initiate the discharging of boiled liquid through the outlet from the housing which is preferably at a location below the upper end of the heater. The present invention has a wide variety of applications including use in the kitchen as a source of hot water for a wide variety of kitchen functions, in vending machines, sterilizers, industrial applications, etc. The present invention may be utilized to boil water for the purposes of rendering it potable.

The apparatus of the present invention does not store a large quantity of liquid at its boiling temperature and does not utilize a thermostat control. For the purposes of this disclosure, the liquid will be discussed hereinafter as being water. However, it will be understood that the present invention may be utilized with other liquids such as oil, antifreeze, etc.

For the purpose of illustrating the invention, there is shown in the drawings a form which is presently preferred; it being understood, however, that this invention is not limited to the precise arrangements and instrumentalities shown.

FIG. 1 is a vertical sectional view of apparatus in accordance with the present invention.

FIG. 2 is a partial sectional view of another embodiment of the present invention.

FIG. 3 is a sectional view taken along the line 3—3 in FIG. 2.

FIG. 4 is a schematic elevation view of the present invention incorporated into a vending machine.

FIG. 5 is a schematic electrical wiring diagram utilized in connection with the apparatus of FIG. 4.

Referring to the drawing in detail, wherein like numerals indicate like elements, there is shown in FIG. 1 apparatus in accordance with the present invention designated generally as 10. The apparatus 10 includes a housing 12 having an inlet valve 14 and an outlet 16 at its lower end. The outlet 16 communicates with a spigot 18. The spigot 18 terminates at its upper end in a discharge port generally at the elevation of the upper end of the housing 12. Such disposition for the discharge port of the spigot 18 avoids siphonic flow through the housing 12, and also insure a sufficient liquid level in housing 12.

The inlet valve 14 is connected to a source 22 of water under pressure by way of conduit 20. Conduit 20 communicates with housing 12 by way of passage 29 and port 28 in metering plate 42. A float 24 is provided within the housing 12. It will be noted that the float 24 has a necked down portion 26 intermediate its upper and lower ends and that the diameter of the float 24 is about 80% of the diameter of the housing 12. The diameter of float 24 is preferably 50–90% of the diameter of the housing 12. A needle valve member 58 is connected to the float 24. Valve member 58 is provided with a head 32 adapted to cooperate with a valve seat in the form of an O-ring 56 to control flow from conduit 20 into the housing 12.

The lower end of the float 24 may be provided with a dashpot 40. In this regard, the dashpot 40 includes an enlarged head 41 disposed within an upright well 43. The water within the well 43 cooperates with the enlarged head 41 to regulate the rate of ascent and descent of the float 24. The dashpot 40 substantially reduces any flutter in the movements of the float 24.

Metering plate 42 is removably secured to the housing 12 in any convenient manner such as by threads. As illustrated, the well 43 is integral with the plate 42. A wrench socket 44 is provided on the bottom surface of access plug 45. An electrical heater 46 of the immersion type is disposed within the housing 12 and supported by the plate 42. Electrical wires are connected to the heater 46 at exposed portions thereof below the plate 42. A baffle 47 surrounds heater 46 and directs heated water vertically upwardly toward float 24. Flow of electrical current to the heater 46 is controlled by an on-off switch 48.

The housing 12 may be provided with a manually operable bleed valve 50 for eliminating any air locks. Bleed valves of this type are conventional. In connection with the following description, a vapor zone 52 will be generated in the housing 12 with the liquid-vapor interface designated as 54.

The apparatus 10 is utilized as follows. It will be assumed that conduit 2: contains water under pressure such as the pressure available in the home from municipal water supplies. With the switch 48 in its off position, the level of water in the housing 12 raises the float 24 until head 32 seats on O-ring 56 so as to close off the inflow of water from conduit 20. When switch 48 is turned to an on position, the coils of heater 46 immediately begins to heat the residual water in the housing 12 to its boiling temperature. In order that this may be accomplished in a short period of time, the heater 46 utilizes substantial power such as 3–5KW while at the same time the residual amount of water in the housing 12 is substantially small.

The boiling of the water within the housing 12 creates a vapor zone 52 thereabove. Due to the location of the outlet 16 and baffle 47, little or no steam is permitted to discharge from the spigot 18. As the water turns to steam the vapor zone 52 increases and the liquid-vapor interface 54 descends. During operation, the metering function of the valve member 58 keeps the system stabilized such that the amount of water heated to boiling and discharged from spigot 18 equals the amount of water admitted into the housing 12. When the level of float 24 is sufficiently low so that head 32 moves away from the valve seat defined by O-ring 56, water is admitted to housing 12. The vapor pressure in zone 52 and the pressure of the water displaces the boiling water in housing 12 and forces it out of the spigot 18. As water is admitted into chamber 12 through port 28 it tends to lower the temperature of the water in the chamber somewhat condensing some steam 52. The combined addition of water and condensation from the steam causes float 24 and valve member 58 to rise.

As valve member 58 rises, the volume of water which can be admitted into housing 12 decreases. This decrease in volume of water causes the float 24 to descend. The metering function and discharge of boiling water continue until switch 48 is shut off. When switch 48 is shut off no more incoming water is changed to steam and the liquid-vapor interface 54 quickly rises to cause the head 32 to engage the O-ring 56 and terminate the introduction of water into the housing 12. Initiation or termination or discharge of boiling water from spigot 18 is responsive solely to turning the switch 48 on or off. However, if desired, spigot 18 may be provided with a valve responsive to turning the switch 48 on or off whereby such valve would be open when the switch 48 is on and vice versa.

The apparatus 10 is simple and inexpensive to install. The size of the apparatus 10 is substantially smaller than a conventional home hot water heater so that it may be installed in a kitchen of a home or form part of a vending machine. If desired, the source 22 of water under pressure could be the conventional hot water heater in a home whereby the time lag for discharge of boiling water from the spigot 18 would be substantially less than that if the source 22 were the conventional municipal supply pipe containing water at ambient temperature.

In FIG. 2, there is illustrated another embodiment of the present invention which is identical with that described above except as will be made clear hereinafter. Hence, corresponding elements have been provided with corresponding primed numerals.

The float 24' is provided with a needle valve member 58' having a head 32'. The head 32' has a sharp annular edge 30' which cooperates with a valve seat 31' which may be in the form of a resilient ring of polymeric plastic material. The valve member 58' has a circular scraper 34 thereon. The diameter of the scraper 34 is slightly less than the diameter of port 28'. Scraper 34 prevents any substantial buildup of minerals in the port 28'. When the valve member 58' is in an open disposition, water from the inlet valve 14' may flow into the housing 12' to some extent around the valve member 58' but primarily flows through the metering grooves 38. The grooves 38 become wider and deeper at their end adjacent to float 24'. Hence, the rate of flow into housing 12' increases as the float 24 descends.

In FIG. 4, there is shown the apparatus 10 of the present invention in conjunction with a preheater which preheats the water up to a temperature such 180° F. Thus, the apparatus as shown in FIG. 4 could be incorporated as part of a vending machine. Water flows through conduit 60 to the inlet valve 14. A portion of the conduit 60 is wrapped around a heater 62 controlled by thermostat 64. Insulation 66 may extend around the heater 62 and the portion of the conduit 60 associated therewith.

In FIG. 5, there is illustrated a diagrammatic wiring diagram adapted to be used with the apparatus as shown in FIG. 4. The diagram includes the heaters 62 and 46 in parallel with a master on-off switch 68. Selector switch 70 selectively connects one of the heaters 46, 62 across the potential of source 72. Switch 70 would normally be in a position source to couple heater 62 to the source of potential. When the temperature in conduit 60 reaches a predetermined maximum such as 180° F, thermostat 64 would open a switch to break the circuit. When it is desired to dispense boiling hot water into cup 74, switch 70 is manipulated to the position shown in FIG. 5 which turns on the heater 46 and shuts off the heater 62. As soon as the cup 74 is filled, the switch 70 is manipulated to the phantom position in FIG. 5 wherein heater 62 is again connected to the potential of source 72.

Thus, it will be seen that the present invention involves a novel structural interrelationship of a housing, float operated inlet valve and heater whereby liquid at a boiling temperature may be continuously dispensed in response to the liquid-vapor interface. The response time for discharge of boiling liquid is small and directly related to the power capacity of the heater and the small amount of residual liquid in the housing 12. The apparatus is self-compensating for changes in line current for the electricity coupled to the heater 46 or in the water pressure and conduit 20 while at the same time being predicated on a control responsive to an absolute condition, namely the boiling temperature of liquids at atmospheric pressure. It will be noted that the present invention does not involve a pressure vessel whereby there are no dangers of explosions.

The apparatus 10 may be made from any one of a wide variety of materials. The components of the apparatus 10 are preferably made from non-corrosive metal such as stainless steel, aluminum, etc. A wide variety of modifications will be obvious to those skilled in the art such as the provision of a nozzle or aerator on the free end of spigot 18.

The present invention may be embodied in other specific forms without departing from the spirit or essential attributes thereof and, accordingly, reference should be made to the appended claims, rather than to the foregoing specification as indicating the scope of the invention.

I claim

1. Apparatus for dispensing liquid at its boiling temperature comprising a housing having an inlet means for connection to a source of liquid under pressure and an outlet for discharging a boiling liquid, a spigot connected to said outlet, said spigot extending to an elevation above the liquid-vapor interface and terminating at a discharge port above the elevation of said outlet, the upper end of said housing being closed so that it may confine a vapor of the liquid above liquid level, a float in said housing above the elevation of said outlet and responsive to the liquid-vapor interface, an inlet valve means for controlling flow through said inlet into said housing, said valve means including a metering valve member, said metering valve member being coupled to said float for movement therewith in response to the elevation of said float in said housing, an electrical heater means in said housing for rapidly heating liquid to its boiling temperature and for creating a vapor in the zone above liquid level so that said inlet valve means is controlled in response to the elevation of the liquid-vapor interface in aid housing, whereby the rate of flow of said liquid through said inlet into said housing increases as said float descends and decreases as said float ascends, and an on-off switch means for operating said heater means to initiate the discharge of boiling liquid through said outlet.

2. Apparatus in accordance with claim 1 including a baffle between said outlet and said heater.

3. Apparatus in accordance with claim 2 wherein said float has a transverse dimension of about 50-90 % of the transverse dimension of said housing, and said float having a necked down portion intermediate its upper and lower ends so that said necked down portion is located at the liquid-vapor interface.

4. Apparatus in acordance with claim 3 including a dashpot connected to one end of said float, said metering valve member being connected directly to said float and axially aligned therewith.

5. Apparatus in accordance with claim 1 including a conduit connected to said inlet, means associated with said conduit for preheating the liquid before the liquid flows through the inlet to said housing.

6. Apparatus in accordance with claim 1 wherein said outlet is connected to said housing adjacent the elevation of said heater.

7. Apparatus in accordance with claim 1 wherein said outlet is free from any valve to control flow therethrough, and said heater being free from any thermostat so as to be responsive solely to said on-off switch means which constitutes the sole means for initiating discharge of liquid through said outlet.

8. Apparatus in accordance with claim 1 including means to cause the valve member to meter the flow of liquid into said housing at an increased rate as the float descends and at a decreased rate as the float ascends.

9. Apparatus for heating a liquid to its boiling temperature and dispensing the same at its boiling temperature comprising a housing having a height substantially greater than its transverse dimensions and vapor tight at its upper end, a float in said housing, the height of said float being substantially greater than its transverse dimensions, the transverse dimensions of said float being at least 50% of the transverse dimensions of said housing, valve means for conrolling flow into the housing, said valve means including a metering valve member connected to said float for movement therewith, said housing having an inlet means for connection to a source of liquid under pressure and being adjacent to said valve means, said housing having an outlet below the elevation of said float, a spigot connected to said outlet, said spigot extending to an elevation above the liquid-vapor interface and terminating at a discharge port above the elevation of said outlet, and heater means in said housing below said float controlled by switch means to initiate flow from said inlet to said outlet by rapidly heating the liquid to its boiling temperature so that said metering valve member moves in response to the elevation of a liquid-vapor interface in said housing such that the rate of flow of said liquid is decreased as said float ascends and as said float descends.

10. Apparatus in accordance with claim 9 including a dashpot coupled to said float, said dashpot and said heater means being supported by a bottom wall of said housing, means removably connecting said bottom wall to said housing.

11. Apparatus in accordance with claim 9 including preheater means for preheating liquid to be introduced into said housing, said preheater means and said heater means being coupled to a source of energy by circuitry including switch means so that they are alternatively operable.

12. Apparatus in accordance with claim 9 wherein said float has a necked down portion intermediate its ends, said float having a specific gravity so that the necked down portion is adjacent the liquid-vapor interface.

13. Apparatus for heating a liquid to its boiling temperature and dispensing the same at its boiling temperature comprising a housing having a height substantially greater than its transverse dimensions and a confined vapor zone at its upper end, a float in said housing, the height of said float being substantially greater than its transverse dimension, the transverse dimensions of said float being at least 50% of the transverse dimensions of said housing, said float having a necked down portion intermediate its ends, said float having a specific gravity so that the necked down portion is adjacent a liquid-vapor interface in said housing, valve means for conrolling flow into the housing, said valve means including a valve member connected to the float for movement therewith, said housing having an inlet means for connection to a source of liquid under pressure at said valve means, means on the valve member to meter the flow of liquid into said housing at an increased rate as the float descends and at a decreased rate as the float ascends, said housing having an outlet below the elevation of the float, heater means in said housing adjacent the inlet to initiate flow from said inlet to said outlet by rapidly heating the liquid to its boiling temperature in said housing below said float and to create vapor in said zone so that the float moves the valve member in response to the elevation of a liquid-vapor interface in said housing, switch means for said heater, said switch means constituting the sole means for initiating said flow, said outlet being connected to a spigot lacking a control valve, said spigot extending to an elevation adjacent the upper end of said housing and terminating at a discharge port adjacent the upper end of said housing.

* * * * *